(12) United States Patent
Le Saux et al.

(10) Patent No.: US 8,290,081 B2
(45) Date of Patent: Oct. 16, 2012

(54) TRANSMISSION/RECEPTION METHODS AND MODULES FOR A MULTIPLE-CARRIER MULTIPLE-ANTENNA SYSTEM USING TRAINING SEQUENCES

(75) Inventors: Benoit Le Saux, Rennes (FR); Maryline Helard, Rennes (FR); Laurent Boher, Rennes (FR)

(73) Assignee: France Telecom, Paris (FR)

( * ) Notice: Subject to any disclaimer, the term of this patent is extended or adjusted under 35 U.S.C. 154(b) by 639 days.

(21) Appl. No.: 12/515,989

(22) PCT Filed: Nov. 19, 2007

(86) PCT No.: PCT/FR2007/052363
§ 371 (c)(1),
(2), (4) Date: May 22, 2009

(87) PCT Pub. No.: WO2008/062131
PCT Pub. Date: May 29, 2008

(65) Prior Publication Data
US 2009/0304104 A1    Dec. 10, 2009

(30) Foreign Application Priority Data
Nov. 24, 2006   (FR) ...................................... 06 55106

(51) Int. Cl.
*H04K 1/10* (2006.01)
*H04L 27/28* (2006.01)
(52) U.S. Cl. ....................................... 375/267; 375/260

(58) Field of Classification Search .................. 375/347, 375/144, 260, 130, 267
See application file for complete search history.

(56) References Cited

U.S. PATENT DOCUMENTS 6,665,308 B1 * 12/2003 Rakib et al. ................... 370/441
7,450,489 B2 * 11/2008 Sandhu ......................... 370/204

OTHER PUBLICATIONS

Barhumi et al , "Optimal Training design for MIMO OFDM Systems in Mobile Wireless Channels", Jun. 2003, IEEE.*
Barhumi et al., Optimal Training Design for MIMO OFDM Systems in Mobil Wireless Channels, Jun. 2003, IEEE.*
Barhumi et al., "Optimal Training Design for MIMO OFDM Systems in Mobile Wireless Channels," IEEE Transactions on Signal Processing, IEEE Service Center, New York, NY, US, vol. 51 (6), pp. 1615-1624 (Jun. 2003).
Ye et al., "Simplified Channel Estimation for OFDM Systems With Multiple Transmit Antennas," IEEE Transactions on Wireless Communications, IEEE Service Center, Piscataway, NJ, US, vol. 1(1), pp. 67-75 (Jan. 2002).

* cited by examiner

*Primary Examiner* — David C. Payne
*Assistant Examiner* — Wednel Cadeau
(74) *Attorney, Agent, or Firm* — Drinker Biddle & Reath LLP

(57) ABSTRACT

The present invention relates to a transmission method and device suitable for a system using Nt transmit antennas $TX_i$ and Nr receive antennas $RX_j$. The symbols transmitted are inserted in a time-frequency frame that contains a training sequence. Each training sequence is constructed from replicas of a basic training sequence. At least one of the training sequences includes at least two replicas at least one of which is phase offset.

18 Claims, 3 Drawing Sheets

TRANSMISSION/RECEPTION METHODS AND MODULES FOR A MULTIPLE-CARRIER MULTIPLE-ANTENNA SYSTEM USING TRAINING SEQUENCES

CROSS-REFERENCE TO RELATED APPLICATIONS

This application is the U.S. national phase of the International Patent Application No. PCT/FR2007/052363 filed Nov. 19, 2007, which claims the benefit of French Application No. 06 55106 filed Nov. 24, 2006, the entire content of which is incorporated herein by reference.

BACKGROUND OF THE INVENTION

The field of the present invention is telecommunications. Within that field, the invention relates more particularly to digital communication. Digital communication includes wireless radio communication and cable communication. The communication transmission medium is commonly called the transmission or propagation channel, originally with reference to an aerial channel and by extension with reference to any channel.

SUMMARY OF THE INVENTION

The invention relates to transmission and reception techniques specifically adapted to estimate transmission channels in a multi-antenna system of the MIMO (multiple-input multiple-output) or MISO (multiple-input single-output) type using multiple carriers and equalization in the frequency domain or the time domain. In a system with multiple transmit or receive antennas, there are as many transmission channels as there are transmit antenna/receive antenna pairs; these channels are sometimes called sub-channels. Estimation consists in estimating the impulse response of each of these channels. The invention applies to multiple-carrier multiple-antenna systems typically using at least two transmit antennas. However, the invention applies equally to a system using only one transmit antenna.

These systems use a frame of content, at the input of the transmitter, that consists of payload data symbols, i.e. symbols that code the information of an input signal, and at the output of the same device, that is divided in time and in frequency for transmission on a plurality of carriers. FIG. 1 is an illustration of an OFDM (orthogonal frequency division multiplex) frame with payload data symbols D in white and pilot symbols SP in black. A time-frequency frame determines the placement in time of the payload data symbols and the pilot symbols on the various carriers. Furthermore, the presence of a plurality of transmit antennas enables spatial diversity to be introduced by multiplexing the payload data between the antennas. Below in the present document the term "data" refers to payload data.

The invention can be applied to uplink communication (from a terminal to a base station) and to downlink communication (from a base station to a terminal).

One example of application of the invention is the field of fixed or mobile radio communication, notably for fourth generation and later systems typically referred to as B3G (Beyond 3$^{rd}$ Generation) systems. These systems include MC-CDMA (multi-carrier code division multiple access) systems and OFDMA (orthogonal frequency division multiple access) downlink or uplink systems using an MIMO (multiple-input multiple-output) transmission scheme in which data to be transmitted is divided between time-frequency frames including pilot symbols and possibly null carriers. The invention applies in particular to any type of system using OFDM modulation, for example OFDMA or LP-OFDM systems, and to IFDMA systems.

Standard transmission methods include a modulation step. If differential modulation (non-coherent system) is not used, it is imperative for the receiver to estimate the propagation channel (coherent system) in order to be able to equalize the received signal and detect the bits transmitted. Differential modulation as applied to multiple-antenna systems is not at present considered a promising candidate for high bit rate communications systems. It doubles the noise level, which degrades performance by around 3 decibels (dB).

The channel estimation function is therefore particularly important for multi-antenna systems because the performance of these systems is directly linked to channel estimation in the receiver. In multiple-antenna systems, this function must estimate the various channels connecting a transmit antenna to a receive antenna independently of each other.

Several transmission techniques are already known that are suitable for transmission channel estimation in a multiple-antenna system including a plurality of transmit antennas. These techniques include those that rely on reference symbols, called pilot symbols, inserted into the time-frequency frame on transmission. These pilot symbols are known to the receiver and they enable it to estimate the transmission channels corresponding to each transmit antenna. Theoretically, the capacity of MIMO systems increases linearly with whichever is the lower: the number of transmit antennas and the number of receive antennas. In practice, the usable spectral efficiency falls as the number of antennas increases because of the necessary presence of pilot symbols in the frame.

Various techniques exist for inserting pilot symbols into the time-frequency frame transmitted by an antenna. The set of all pilot symbols for the same time-frequency frame forms a training sequence. In a multiple-antenna system there are as many training sequences as there are transmit antennas.

A known technique for inserting pilot symbols and shown in FIG. 2 transmits from each transmit antenna a training pulse, or more generally a training sequence, that is time offset between antennas by a value $\Delta t$ so that the receiver connected to each receive antenna can isolate the impulse responses of the various transmission channels in the time domain. For example, $\tilde{c}(p), p=0, \ldots, Np-1$ is the pilot symbol transmitted on the $p^{th}$ carrier frequency by the transmit antenna $TX_1$. Np is the number of pilot carriers. The pilot symbol transmitted on the same OFDM symbol by the antenna $TX_i$ is therefore given by the equation:

$$\tilde{c}(p)_i = \tilde{c}(p) e^{-j2\pi \frac{p(i-1)\Delta t}{Np}}$$

where $\Delta t$ is the time offset between the pulses transmitted by the various antennas. For the impulse responses of the various sub-channels not to interfere with each other, the condition $L \leq \Delta t$ must apply, where L is the maximum spread of the delays of the various sub-channels. Moreover, a condition for determining all impulse responses is $Nt \times L \leq Np$, where Nt is the number of transmit antennas $TX_i$. To meet this latter condition, the time offset $\Delta t$ is chosen to satisfy the condition $Nt \times \Delta t \leq Np$.

The paper by M-S. Baek, H-J. Kook, M-J. Kim, Y-H. You, and H-S. Song, "Multi-Antenna Scheme for High Capacity Transmission in the Digital Audio Broadcasting", IEEE Transactions on Broadcasting, Vol. 51, No. 4, December 2005 and the paper by I. Barhumi, G. Leus, and M. Moonen, "Optimal Training Design for MIMO OFDM Systems in Mobile Wireless Channels", IEEE Transactions on Signal Processing, Vol. 51, No. 6, June 2003 rely on this technique. In the first paper, all the sub-carriers of an OFDM symbol are dedicated to channel estimation, which enables the receiver to recover the various impulse responses ahead of OFDM demodulation. In contrast, in the second paper, multiplexing the payload data symbols and the pilot symbols, with the pilot systems shared over one or more OFDM symbols to form a training sequence, implies that the operation of recovering the impulse responses on reception is effected after OFDM demodulation. This operation employs a matrix A constructed from the training sequence and a Fourier matrix of appropriate dimension. Estimating the coefficients of the various impulse responses entails multiplying the received signal demodulated by the pseudo-inverse matrix of this matrix A. The methods disclosed have the advantage of preserving the disposition of the pilot symbols of a single antenna-frame between the various transmit antennas, using the same set of sub-carriers for all pilot frequencies, and avoiding the mandatory presence of null pilot symbols. They therefore offer high spectral efficiency. Their advantage is that they estimate the channel for all modulated carriers.

An objective of the invention is to be even more efficient than known methods of transmitting time-frequency frames with inserted pilot symbols forming a training sequence when used in a system with at least one antenna, in order to improve performance.

To this end, the present invention consists in a transmission method, a transmission module, a channel estimation method, and a channel estimator module.

A transmission method according to the invention is suitable for a system with Nt transmit antennas $TX_1$ to $TX_{Nt}$ and Nr receive antennas, where Nt and Nr are greater than or equal to 1, a transmit antenna being separated from a receive antenna by a transmission sub-channel, and is implemented by Nt multiple-carrier transmitters each including a multiplexing and modulation module using $N_{FFT}$ orthogonal functions forming orthogonal symbols intended to be transmitted by the Nt transmit antennas. The method is noteworthy in that it includes the steps of:

determining a basic training sequence č(p) determined by the position of Np pilot symbols in a time-frequency frame;

determining $$Kn = \left(\sum_{i=1}^{Nt} K_i\right)$$

replicas of the basic training sequence č(p) such that at least one replica is time offset from the basic sequence, with $K_i \geq 1$ and at least one $K_i \geq 2$, subject to the constraints that the extreme time offset between replicas must be less than the number Np of pilot carriers and that the minimum time offset between replicas of two training sequences is greater than or equal to the maximum spread of the delays of the sub-channels; and determining a training sequence for each transmit antenna $TX_i$ as the sum of the $K_i$ replicas.

A transmission module according to the invention includes a multiplexing and modulation module using $N_{FFT}$ orthogonal functions, suitable for a multiple-antenna system using Nt transmit antennas $TX_1$ to $TX_{Nt}$, Nr receive antennas, where Nt and Nr are greater than or equal to 1, and a time-frequency frame for each transmit antenna including pilot symbols and data symbols of a payload signal, the data symbols and the pilot symbols being frequency-modulated by the multiplexing and modulation module to form orthogonal symbols that are transmitted by a transmit antenna in the form of a multiple-carrier signal using $N_{FFT}$ carriers and using Np pilot carriers. This module is noteworthy in that it includes:

a module for determining a basic training sequence determined by the position of Np pilot symbols in the time-frequency frame associated with a particular transmit antenna;

a module for determining Kn, where $$Kn = \left(\sum_{i=1}^{Nt} K_i\right),$$

replicas of the basic training sequence such that at least one replica is time offset from the basic sequence, with $K_i \geq 1$ and at least one $K_i \geq 2$, subject to the constraints that the extreme time difference between replicas is less than the number Np of pilot carriers and that the minimum time offset between replicas of two training sequences is greater than or equal to the maximum spread of the delays of the sub-channels connecting a transmit antenna to a receive antenna; and a module for determining a training sequence for each transmit antenna as the sum of $K_i$ replicas.

A method according to the invention for estimating transmission sub-channels in a multiple-antenna system using Nt transmit antennas, where Nt is greater than or equal to 1, at least one receive antenna, and a time-frequency frame for each transmit antenna including Np pilot symbols forming a training sequence and data symbols of a payload signal, each of the Nt training sequences being the sum of $K_i$ replicas of a basic training sequence, either time offset or not, such that the values $K_i$ are greater than or equal to 1 and at least one value $K_i$ is greater than or equal to 2, being known to the receiver and enabling the receiver to estimate an impulse response corresponding to the transmission channel separating a transmit antenna from a receive antenna concerned, the data symbols and the pilot symbols being frequency-modulated by a multiplexing and modulation module using $N_{FFT}$ orthogonal functions to form orthogonal symbols that are transmitted by the transmit antennas in the form of a multiple-carrier signal with $N_{FFT}$ carriers. This method is noteworthy in that it includes:

a step of computing a matrix A constructed in the form of blocks from the training sequences and from the Fourier matrix of dimensions $N_{FFT} \times N_{FFT}$, the number of blocks of which is equal to the product of the number of orthogonal symbols of the basic training sequence by the sum of the values $K_i$, a block being determined by the product of a diagonal matrix formed of the pilot symbols contained in an orthogonal symbol of the training sequence associated with the block multiplied by the Fourier matrix, and in that it includes, for a receive antenna under consideration:

a step of computing $K_i$ estimates of at least one of the Nt impulse responses in the time domain by multiplying by the pseudo-inverse matrix of the matrix A Np pilot symbols extracted from a frequency-domain signal obtained after demodulation of a time-domain signal received by the receive antenna concerned by means of a Fourier transform of size $N_{FFT}$; and a step of computing an average over the $K_i$ estimates of the impulse response concerned.

A module according to the invention for estimating transmission channels in a multiple-antenna system using Nt transmit antennas, where Nt is greater than or equal to 1, at least one receive antenna and a time-frequency frame for each transmit antenna including pilot symbols forming a training sequence and data symbols of a payload signal, the Nt training sequences being known to the receiver and enabling the receiver to estimate Nt impulse responses corresponding to the Nt transmission channels respectively separating one of the transmit antennas from the receive antenna concerned, the data symbols and the pilot symbols being frequency-modulated by a multiplexing and modulation module using $N_{FFT}$ orthogonal functions to form orthogonal symbols that are transmitted by the transmit antennas in the form of a multiple-carrier signal using $N_{FFT}$ carriers with Np pilot carriers. This module is noteworthy in that it includes:

means for computing a matrix A constructed in the form of blocks from the training sequences and from the Fourier matrix of dimensions $N_{FFT} \times N_{FFT}$, the number of blocks of which is equal to the product of the number of orthogonal symbols of the basic training sequence by the sum of the values $K_i$, a block being determined by the product of a diagonal matrix formed of the pilot symbols contained in an orthogonal symbol of the training sequence associated with the block multiplied by the Fourier matrix, and in that it includes, for a receive antenna under consideration:

means for computing $K_i$ estimates of at least one of the Nt impulse responses in the time domain by multiplying by the pseudo-inverse matrix of the matrix A Np pilot symbols extracted from a frequency-domain signal obtained after demodulation of a time-domain signal received by the receive antenna concerned by means of an FFT of size $N_{FFT}$; and means for computing the average of the $K_i$ estimates of the impulse response concerned.

The transmission method, the estimation method, and the associated modules and devices of the invention solve the stated problem. Transmitting at least one training sequence including at least two replicas of a basic training sequence at least one of which is time offset produces at least two estimates of the same impulse response and so an average of those estimates can be computed. This improves the estimate of the impulse response of a channel.

In one particular embodiment, a guard interval is added before transmitting an orthogonal symbol and the constraint on the minimum value of the time offset is complied with by choosing a minimum time offset equal to the value of the guard interval.

In one particular embodiment, the replicas are advantageously determined in the frequency domain and the time offsets for the replicas are obtained by inserting a phase offset that is easy to compute. In a first embodiment, the phase offset values are chosen in a particular order, which is known to at least one receiver associated with a receive antenna of the system. In a second embodiment, the phase offset is a function of a carrier index.

In one particular embodiment, the basic training sequence is spread over a plurality of orthogonal symbols.

In one particular embodiment, each of the impulse response estimates is computed from the Np pilot carriers over a time interval $\Delta t$. This two-fold limitation advantageously reduces the computations required and therefore reduces the computation power necessary to implement the method.

In one particular embodiment, computation of the impulse responses is repeated for each receive antenna concerned of the multiple-antenna system. This embodiment is suitable for systems including a plurality of receive antennas.

The invention consists further in a transmitter for a multiple-antenna system. The transmitter includes at least one transmission module as defined above.

The invention consists further in a receiver for a multiple-antenna system. The receiver includes at least one transmission channel estimator module as defined above.

The invention consists further in a multiple-antenna system including at least one receiver and/or one transmitter as defined above.

In a preferred embodiment, the multiple-antenna system typically has at least two transmit antennas and is a MIMO system or a MISO system. In the remainder of this document, a MIMO system is to be understood as a system with a plurality of transmit antennas, regardless of the number of receive antennas (Nr≧1).

In a preferred embodiment, the steps of the method are determined by instructions of a transmission, respectively estimation, program in an electronic circuit such as a microchip that can be included in an electronic device such as a transmitter, respectively, a receiver. The transmission, respectively estimation, method of the invention can equally well be executed when this program is loaded into a computation unit such as a processor or the like the operation of which is then controlled by the execution of the program.

Consequently, the invention applies equally to a computer program, notably a computer program on or in an information medium, adapted to implement the invention. This program can use any programming language and take the form of source code, object code or a code intermediate between source code and object code, such as a partially-compiled form, or any other form desirable for implementing a method of the invention.

The information medium can be any entity or device capable of storing the program. For example, the medium can include storage means such as a ROM, for example a CD ROM or a microelectronic circuit ROM, or magnetic storage means, for example a floppy disk or a hard disk.

Alternatively, the information medium can be an integrated circuit incorporating the program and adapted to execute the method in question or to be used in its execution.

Moreover, the transmission or estimation program can be translated into a transmissible form such as an electrical or optical signal, which can be routed via an electrical or optical cable, by radio or by other means. The program of the invention can in particular be downloaded over an Internet-type network or the like.

BRIEF DESCRIPTION OF THE DRAWINGS

Other features and advantages of the invention become apparent in the course of the following description given with reference to the appended figures provided by way of non-limiting example.

DETAILED DESCRIPTION

Figure 3:
FIG. 3 is an illustration of transmission by a system of the invention using one antenna for transmitting a training sequence consisting of two replicas, one of which is time offset, of a basic training sequence equal to one time pulse.

FIG. 3 is an illustration of transmission in accordance with the invention of a training sequence consisting of two replicas of a time pulse, one of which is phase offset.

The situation shown is one with one transmit antenna and one receive antenna for transmitting time-frequency frames using training sequences. According to the invention, the training sequence associated with the transmit antenna consists of at least two replicas of a basic training sequence, that are time offset relative to each other. In this illustration, the basic training sequence is a time pulse. Each replica is used to determine an estimate of the response of the transmission channel between the transmit antenna and the receive antenna. According to the invention, the impulse response of the channel is then determined as the average of those two estimates.

Figure 4:
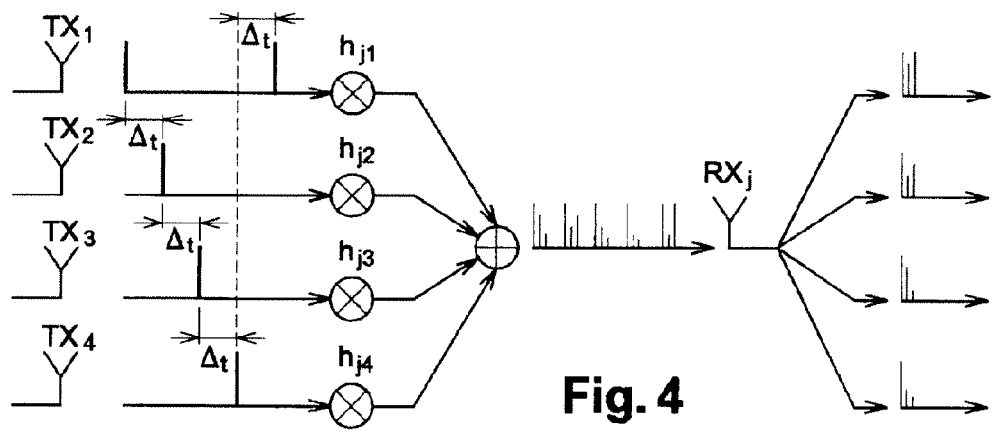
FIG. 4 is an illustration of transmission by a system of the invention using four antennas (Nt=4) for transmitting a training sequence consisting of replicas of a basic training sequence equal to one time pulse, the sequence for the antenna $TX_1$ consisting of two replicas, one of which is time offset.

FIG. 4 is an illustration of transmission by a system of the invention using four antennas to transmit training sequences consisting of replicas of a basic training sequence equal to one time pulse, the training sequence for the antenna $TX_1$ consisting of two replicas, one of which is time offset.

According to the invention, in a multiple-antenna system using a plurality of transmit antennas, the training sequence of at least one transmit antenna consists of at least two replicas of a basic training sequence that are time offset relative to each other. In this illustration, the basic training sequence is a time pulse and the training sequence for the antenna $TX_1$ consists of two replicas that are time offset relative to each other. Each of these replicas is used to determine an estimate of the response of the transmission channel between the transmit antenna $TX_1$ and the receive antenna $RX_j$ concerned. According to the invention, the response of the transmission channel between the transmit antenna $TX_1$ and the receive antenna $RX_j$ is then determined as the average of these two estimates.

Figure 5:
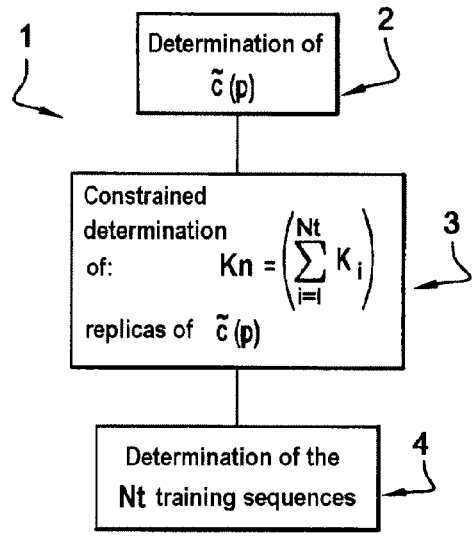
FIG. 5 is a flowchart of a transmission method of the invention.

FIG. 5 is a flowchart of a transmission method 1 of the invention.

A transmission method 1 of the invention is suitable for a system using Nt transmit antennas and Nr receive antennas, where Nt and Nr are both greater than or equal to 1. A transmit antenna is separated from a receive antenna by a transmission sub-channel. The method is implemented by Nt multi-carrier transmitters each including a multiplexing and modulation module using $N_{FFT}$ orthogonal functions forming orthogonal symbols to be transmitted by the Nt transmit antennas $TX_1$ to $TX_{Nt}$. The system uses for each transmit antenna one time-frequency frame containing pilot symbols and payload data symbols. The data symbols and the pilot symbols are frequency-modulated by the multiplexing and modulation modules to form orthogonal symbols that are transmitted by a transmit antenna in the form of a multi-carrier signal using $N_{FFT}$ carriers with Np pilot carriers.

A first step 2 of the method 1 determines a basic training sequence $\tilde{c}(p)$, where p is the index of the pilot carrier.

Figure 1:
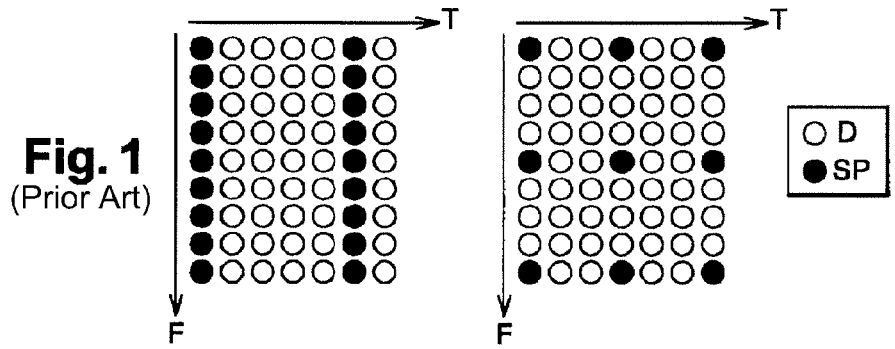
FIG. 1 is an illustration of an OFDM (orthogonal frequency division multiplex) frame.
Figure 2:
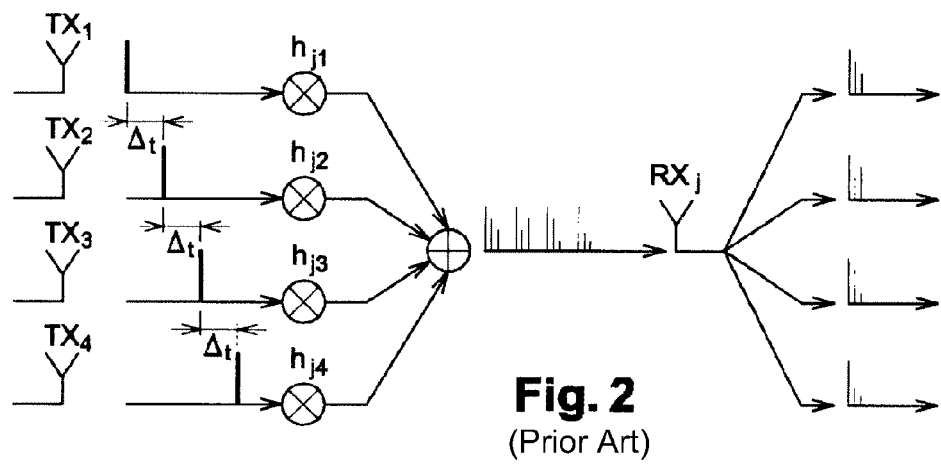
FIG. 2 is an illustration of transmission by a prior art system with four antennas for transmitting training sequences, each consisting of a time pulse that is time offset between antennas.

This sequence is typically determined in the frequency domain by determining the Np pilot carriers and sharing them over one or more orthogonal symbols. These orthogonal symbols are OFDM symbols if the transmit orthogonal modulation is OFDM modulation. If the basic training sequence is shared over a plurality of orthogonal symbols, the pilot carriers of the orthogonal symbols can be identical, different, or partially overlapping. For example, one basic training sequence is one time pulse as illustrated by FIGS. 2, 3, and 4, and such a sequence can be written in the form $\tilde{c}(p)=1$ for $1 \leq p \leq Np$.

A second step 3 of the method determines under constraint a number Kn replicas of index n of the basic training sequence such that at least one replica is time offset from the basic training sequence, where:

$$Kn = \left(\sum_{i=1}^{Nt} K_i\right) \quad (1)$$

The values $K_i$ are equal to or greater than 1 and at least one value $K_i$ is greater than or equal to 2. The constrained determination of replicas, whether time offset or not, is typically effected in the frequency domain by introducing a phase offset of value $\phi_n$ by multiplying the basic training sequence with a phase-rotation factor conforming to the expression:

$$\tilde{c}(p) \times e^{-j\varphi_n} = \tilde{c}(p) \times e^{-j2\pi p \frac{(n-1)}{Np}\Delta t} \quad (2)$$

where $1 \leq n \leq Kn$ and with the following constraints satisfied.

A first constraint is that the extreme time offset between the various replicas of the basic training sequence determined beforehand is less than the number Np of pilot carriers, in other words:

$$Kn \times \Delta t \leq Np \quad (3)$$

A second constraint is that the minimum time offset between two replicas of two training sequences associated with two transmit antennas i and j, $\tilde{c}(p)_i$ and $\tilde{c}(p)_j$, with $i \neq j$, is greater than or equal to the maximum spread of the delays of the various channels:

$$L \leq \Delta t \quad (4)$$

where L is the maximum spread of the delays of the various sub-channels.

Moreover, a condition for determining the set of all impulse responses is $$Nt \times L \leq Np \quad (5)$$

This condition is automatically satisfied if the time offset $\Delta t$ chosen satisfies the above two constraints.

In a third step 4, the method determines the training sequence for each transmit antenna $TX_i$.

For at least one transmit antenna $TX_i$ the training sequence is the sum of $K_i$ replicas of the basic training sequence, where $K_i \geq 2$, with at least one replica from the basic sequence time offset.

In a preferred embodiment of the invention, the training sequences are given by the following expression, on condition that constraints (3), (4), and (5) are satisfied:

$$\tilde{c}(p)_i = \tilde{c}(p) \sum_{k=1}^{K_i} e^{-j2\pi p \frac{(i+(k-1)Nt-1)}{Np}\Delta t} \quad (6)$$

In the particular situation where the value $K_i \geq 2$ is equal to 2, the training sequence of at least one antenna $TX_i$ corresponds to computing the expression:

$$\tilde{c}(p)_i = \tilde{c}(p)e^{-j2\pi\frac{p(i-1)\Delta t}{Np}} + \tilde{c}(p)e^{-j2\pi\frac{p(i+Nt-1)\Delta t}{Np}} \quad (7)$$

For each of the other antennas $TX_i$, the training sequence includes at least one replica of the basic training sequence phase offset by $\phi_i$, with $\phi_i \geq 0$, which corresponds to computing the expression:

$$\tilde{c}(p)_i = \tilde{c}(p)\sum_{k=1}^{K_i} e^{-j\varphi_{i,k}} = \tilde{c}(p)\sum_{k=1}^{K_i} e^{-j2\pi p\frac{(i+(k-1)Nt-1)}{Np}\Delta t} \quad (8)$$

with $K_i \geq 1$ being the number of replicas constituting the training sequence of the antenna $TX_i$ and subject to the constraints (3), (4), and (5) being satisfied.

In one particular embodiment, the training sequence associated with each transmit antenna is the sum of the K replicas of the basic training sequence. For any transmit antenna $TX_i$, the training sequence is preferably given by the following expression, on condition that the constraints (3), (4), and (5) are satisfied:

$$\tilde{c}(p)_i = \tilde{c}(p)\sum_{k=1}^{K} e^{-j2\pi p\frac{(i+(k-1)Nt-1)}{Np}\Delta t} \quad (9)$$

Here $Kn = Nt \times K$.

The next example is given by way of illustration. The parameters of the system take the following values: $N_{FFT} = N_{mod} = Np = 8$, $\Delta t = 2$. $N_{FFT}$, $N_{mod}$, and $Np$ are respectively the size of the FFT, the number of modulated carriers, and the number of pilot carriers. The number g of orthogonal symbols over which the training sequence is spread is taken as equal to 1. The system is a multiple-antenna system with two transmit antennas (Nt=2). Each training sequence is constructed from $K_1 = K_2 = K = 2$ replicas. This yields:

$$\begin{cases} \tilde{c}(p)_1 = \tilde{c}(p)e^{-j2\pi\frac{p\times(1-1)\times 2}{8}} + \tilde{c}(p)e^{-j2\pi\frac{p\times(1+Nt-1)\times 2}{8}} = \tilde{c}(p) + \tilde{c}(p)e^{-j\pi p} \\ \tilde{c}(p)_2 = \tilde{c}(p)e^{-j2\pi\frac{p\times(2-1)\times 2}{8}} + \tilde{c}(p)e^{-j2\pi\frac{p\times(2+Nt-1)\times 2}{8}} = \tilde{c}(p)e^{-j\frac{\pi}{2}p} + \tilde{c}(p)e^{-j\frac{3\pi}{2}p} \end{cases}$$

where $\tilde{c}(p)$ is the pilot symbol from the basic training sequence transmitted at the carrier frequency with index p. The constraint $Kn \times \Delta t \leq Np$ is satisfied since $(2+2) \times 2 = 8 \leq 8$. The pilot symbol $\tilde{c}(p)$ is arbitrarily chosen to be equal to 1 for all pilot carriers. The pattern of the OFDM symbol containing the basic training sequence is represented in Table 1 in Appendix A. The first column of Table 1 represents the frequency indices and the second column the associated data type (P=pilot symbol).

This finally yields for the training sequences of the two antennas:

$$\begin{cases} \tilde{c}(p)_1 = 1 + e^{-j\pi p} \\ \tilde{c}(p)_2 = e^{-j\frac{\pi}{2}p} + e^{-j\frac{3\pi}{2}p} \end{cases}$$

Figure 6:
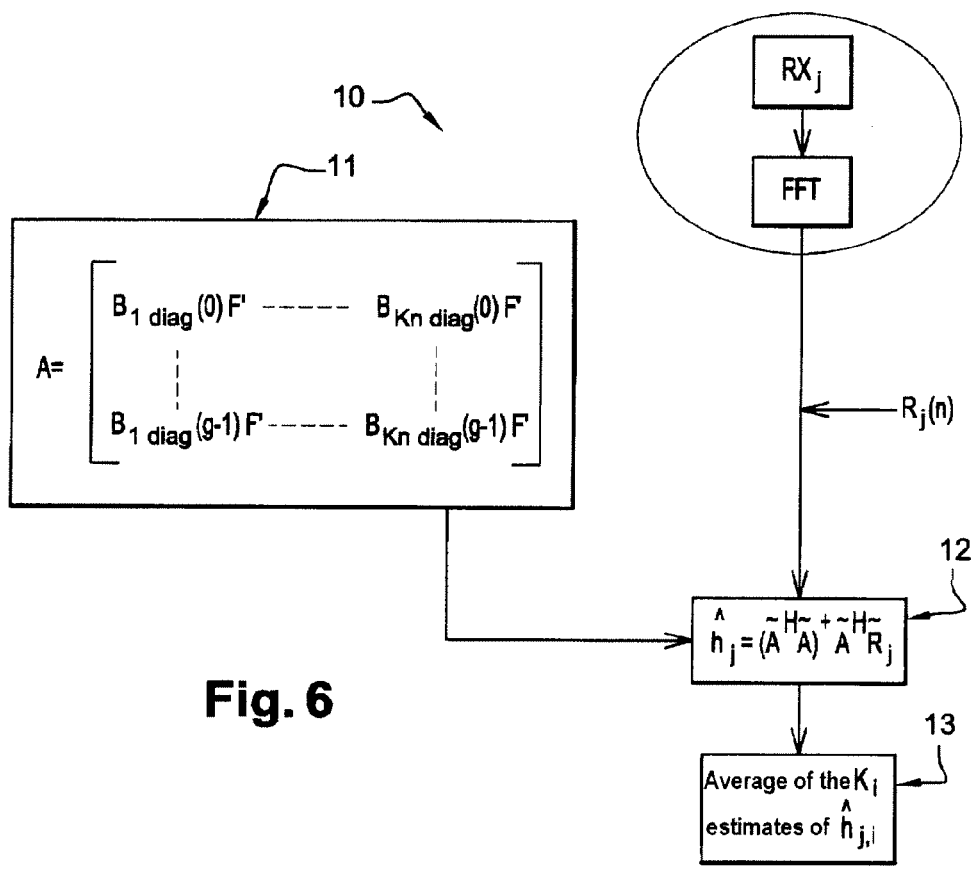
FIG. 6 is a flowchart of an estimation method of the invention.

FIG. 6 is a flowchart of an estimation method 10 of the invention.

The estimation method 10 of the invention estimates transmission channels in a multiple-antenna system using at least one transmit antenna and one receive antenna, $Nt \geq 1$ and $Nr \geq 1$. A transmission channel separates a transmit antenna $TX_i$ from a receive antenna $RX_j$. Each transmit antenna of a multiple-antenna system transmits one time-frequency frame. A time-frequency frame determines the placement in time of the payload data symbols and the pilot symbols on the various carriers. The time-frequency frame can further include null symbols, but as these are not involved in the estimation process they are not referred to in the description. Nor does the description cover guard carriers, because they are not involved in the estimation process either. The pilot symbols for the same transmit antenna form a training sequence. The estimation method of the invention is suitable for signals transmitted by a transmission method conforming to a first embodiment of the invention but can be used for other types of signals, although they would be transmitted with lower efficiency.

The description that follows of the estimation method of the invention assumes that the signals are transmitted by a transmission method conforming to a first embodiment of the invention.

The replicas constituting the Nt training sequences are time offset relative to each other by at least one time slot $\Delta t$. The training sequences are known to the receiver and enable it to estimate Nt impulse responses that correspond to the Nt transmission channels. For a given transmit antenna, the data symbols and the pilot symbols are frequency-modulated by a multiplexing and modulation module using $N_{FFT}$ orthogonal functions, commonly called an orthogonal multiplexer, to form orthogonal symbols that are transmitted by the transmit antenna connected to the orthogonal multiplexer in the form of a multiple-carrier signal using $N_{FFT}$ carriers and using Np pilot carriers. Depending on the time-frequency frame concerned, the pilot symbols can be divided over one or more orthogonal symbols. In one particular embodiment the modulation is OFDM modulation.

An estimation method of the invention is applied in the receiver after demodulation of a time signal received by the receive antenna $RX_j$ concerned and uses an FFT of a certain size to obtain a frequency-domain signal $R_j(n)$ and extract Np pilot symbols from it. In one particular embodiment, the demodulation is OFDM demodulation. The size of the FFT is typically determined as a function of the size $N_{FFT}$ of the FFT used for transmission. These sizes are typically chosen to be identical. On transmission the FFT is of the inverse type whereas on reception the FFT is of the direct type.

At time n, the signal from the receive antenna $RX_j$ can be expressed in the frequency domain, i.e. after suppressing the guard interval and after OFDM demodulation, in the form of a column vector of dimension $N_{FFT}$:

$$R_j(n) = \sum_{i=1}^{Nt} \text{diag}\{X_i(n)\}Fh_{j,i}(n) + \Xi_j(n) \quad (10)$$

where $X_i(n)$ is a column vector of dimension $N_{FFT}$, the OFDM symbol transmitted at the time n by the antenna $TX_i$;

F is the Fourier matrix of size $N_{FFT} \times N_{FFT}$;

$h_{j,i}$ is the column vector representing the L samples of the frequency response of the sub-channel connecting the transmit antenna $TX_i$ to the receive antenna $RX_j$; and $\Xi_j(n)$ is the column vector of dimension $N_{FFT}$ representing the Fourier transform of additive Gaussian white noise.

To simplify the computation, which is advantageous, the estimation method uses the demodulated signal according to equation (10) only over the duration $\Delta t$:

$$R_j(n) = \sum_{i=1}^{Nt} \text{diag}\{X_i(n)\} F' h'_{j,i}(n) + \Xi_j(n) \quad (11)$$

where F' is the matrix consisting of the $\Delta t$ first columns of the Fourier matrix F of size $N_{FFT} \times N_{FFT}$ and $h_{j,i}'$ is a column vector of length $\Delta t$ of which the row elements beyond L are at zero:

$$h_{j,i}' = [h_{j,i}^T, 0_{\Delta t - L}]^T \quad (12)$$

The notation $\text{diag}\{x\}$ denotes a diagonal matrix having the column vector x on its diagonal:

$$\text{diag}\begin{bmatrix} a \\ b \\ c \end{bmatrix} = \begin{bmatrix} a & 0 & 0 \\ 0 & b & 0 \\ 0 & 0 & c \end{bmatrix} \quad (13)$$

The Fourier matrix F is square, with dimensions $N_{FFT} \times N_{FFT}$, and of the following form:

$$F = \frac{1}{\sqrt{N_{FFT}}} \begin{bmatrix} 1 & 1 & 1 & \ldots & 1 \\ 1 & w_{N_{FFT}} & w_{N_{FFT}}^2 & \ldots & w_{N_{FFT}}^{N_{FFT}-1} \\ \vdots & \vdots & \vdots & \ldots & \vdots \\ 1 & w_{N_{FFT}}^{N_{FFT}-1} & w_{N_{FFT}}^{2(N_{FFT}-1)} & \ldots & w_{N_{FFT}}^{(N_{FFT}-1)(N_{FFT}-1)} \end{bmatrix} \quad (14)$$

where $$w_{N_{FFT}} = e^{-j\frac{2\pi}{N_{FFT}}}.$$

The matrix F' is deduced directly from the matrix F:

$$F' = \frac{1}{\sqrt{N_{FFT}}} \begin{bmatrix} 1 & 1 & 1 & \ldots & 1 \\ 1 & w_{N_{FFT}} & w_{N_{FFT}}^2 & \ldots & w_{N_{FFT}}^{\Delta t - 1} \\ \vdots & \vdots & \vdots & \ldots & \vdots \\ 1 & w_{N_{FFT}}^{N_{FFT}-1} & w_{N_{FFT}}^{2(N_{FFT}-1)} & \ldots & w_{N_{FFT}}^{(\Delta t - 1)(\Delta t - 1)} \end{bmatrix} \quad (15)$$

The estimation method 10 of the invention includes a step 11 of computing a matrix A and, for a receive antenna $RX_j$, a step 12 of computing in the time domain estimates of the Nt impulse responses of the Nt channels respectively separating a transmit antenna $TX_i$ from the receive antenna $RX_j$ concerned. The method further includes a step 13 of computing the average of the impulse response estimates.

To obtain the $Nr \times Nt$ channels, steps 12 and 13 must be repeated for each of the receive antennas $RX_j$.

The computation step 11 computes a matrix A constructed in the form of blocks from training sequences and the Fourier matrix with dimensions $N_{FFT} \times N_{FFT}$. The number of blocks is equal to the product of the number of orthogonal symbols of the basic training sequence by the sum of the values $K_i$. Each block is associated with a transmit antenna and an orthogonal symbol over which the training sequence is spread. A block is determined by the product of the diagonal matrix formed by the pilot symbols linked to the block and the Fourier matrix. To limit the computation, which is advantageous, the Fourier matrix is limited to the pilot carriers and to $\Delta t$ time samples, because $\Delta t$ is greater than or equal to the maximum spread of the temporal response of the channel.

Each OFDM symbol transmitted at the time n by the transmit antenna $TX_i$, $X_i(n)$ can be broken down into a vector containing the data symbols and a vector containing the pilot symbols:

$$X_i(n) = S_i(n) + B_i(n) \quad (16)$$

where:

$S_i(n)$ is the payload data symbol vector of dimension $N_{FFT}$ and $B_i(n)$ is the pilot symbol vector of the same dimension.

The equation (11) can therefore be expressed in the form:

$$R_j(n) = \sum_{i=1}^{Nt} \text{diag}\{S_i(n) + B_i(n)\} F' h'_{j,i}(n) + \Xi_j(n) \quad (17)$$

Knowing that $\Delta t \geq L$, it is possible to impose $\Delta t = L$. With this condition, the accumulation of the received vectors corresponding to the g orthogonal symbols transmitted by each transmit antenna containing pilot symbols constituting a training sequence can be expressed in the form:

$$R_j = [R_j(0)^T \ldots R_j(g-1)^T]^T \quad (18)$$
$$= Th_j' + Ah_j' + \Xi_j$$

where:

$R_j$ is a column vector of dimension $N_{FFT} \times g$, T is a matrix of dimensions $(N_{FFT} \times g) \times (Kn \times \Delta t)$ containing the payload data symbols during the training sequences of the Nt transmit antennas;

$$T = \begin{bmatrix} S_{1_{diag}}(0)F' & \ldots & S_{Kn_{diag}}(0)F' \\ \vdots & & \vdots \\ S_{1_{diag}}(g-1)F' & \ldots & S_{Kn_{diag}}(g-1)F' \end{bmatrix} \quad (19)$$

A is a matrix of dimensions $(N_{FFT} \times g) \times (Kn \times \Delta t)$ containing the pilot symbols of the training sequences of the Nt transmit antennas;

$$A = \begin{bmatrix} B_{1_{diag}}(0)F' & \ldots & B_{Kn_{diag}}(0)F' \\ \vdots & & \vdots \\ B_{1_{diag}}(g-1)F' & \ldots & B_{Kn_{diag}}(g-1)F' \end{bmatrix} \quad (20)$$

$h_j'$ is the column vector of dimension $Kn \times \Delta t$ containing the Kn expressions of the estimates of the Nt impulse responses;

$$h_j' = [h_{j,1}^T, \ldots, h_{j,Kn}^T]^T \quad (21)$$

$\Xi_j$ is the column vector of dimension $N_{FFT} \times g$ containing g representations of the Fourier transform of additive Gaussian white noise.

The matrix A determined during the step 11 is therefore expressed in the form:

$$A = \begin{bmatrix} B_{1_{diag}}(0)F' & \ldots & B_{Nt_{diag}}(0)F' & B_{Nt+1_{diag}}(0)F' & \ldots & B_{\sum_{i=1}^{Nt} K_i * Nt_{diag}}(0)F' \\ \vdots & & \vdots & \vdots & & \vdots \\ B_{1_{diag}}(g-1)F' & \ldots & B_{Nt_{diag}}(g-1)F' & B_{Nt+1_{diag}}(g-1)F' & \ldots & B_{\sum_{i=1}^{Nt} K_i * Nt_{diag}}(g-1)F' \end{bmatrix} \quad (22)$$

The step 12 of computing the Kn estimates of the Nt impulse responses in the time domain multiplies the vector $R_j$, the expression for which in the frequency domain at the output of the demodulation corresponds to the Np pilot carriers, by the pseudo-inverse matrix of the matrix A using the Barhumi technique:

$$\hat{h}_j = A^+ R_j \quad (23)$$

in which the symbol $^+$ signifies the following "pseudo-inverse" operation:

$$A^+ = (A^H A)^{-1} A^H \quad (24)$$

To eliminate interference terms caused by the data present in the OFDM symbol, it is necessary to have the product of $A^+$ by T equal to a null matrix, which is made possible by imposing disjoint sets of pilot symbols and data. Moreover, the computation of the impulse responses can be simplified by considering in the equations only the frequencies dedicated to channel estimation, i.e. by limiting the computations to the pilot carriers:

$$\hat{h}_j = \tilde{A}^+ \tilde{R}_j \quad (25)$$

where:
$\tilde{R}_j$ is the matrix corresponding to $R_j$ considering only the pilot carriers, and where:
the expression for the matrix $\tilde{A}$ is as follows:

$$\tilde{A} = \begin{bmatrix} \tilde{B}_{1_{diag}}(0)\tilde{F}' & \ldots & \tilde{B}_{Kn_{diag}}(0)\tilde{F}' \\ \vdots & & \vdots \\ \tilde{B}_{1_{diag}}(g-1)\tilde{F}' & \ldots & \tilde{B}_{Kn_{diag}}(g-1)\tilde{F}' \end{bmatrix} \quad (26)$$

or:

$$\tilde{A} = \begin{bmatrix} \tilde{B}_{1_{diag}}(0)\tilde{F}' & \ldots & \tilde{B}_{Nt_{diag}}(0)\tilde{F}' & \tilde{B}_{Nt+1_{diag}}(0)\tilde{F}' & \ldots & \tilde{B}_{\sum_{i=1}^{Nt} K_i * Nt_{diag}}(0)\tilde{F}' \\ \vdots & & \vdots & \vdots & & \vdots \\ \tilde{B}_{1_{diag}}(g-1)\tilde{F}' & \ldots & \tilde{B}_{Nt_{diag}}(g-1)\tilde{F}' & \tilde{B}_{Nt+1_{diag}}(g-1)\tilde{F}' & \ldots & \tilde{B}_{\sum_{i=1}^{Nt} K_i * Nt_{diag}}(g-1)\tilde{F}' \end{bmatrix} \quad (27)$$

The vector expression of the first estimate of the impulse response $\hat{h}_{j,i}$ of the channel separating the particular transmit antenna i, for i taking a value between 1 and Nt, from the particular receive antenna j, for j taking a value between 1 and Nr, is obtained by effecting a selection of the Np successive samples of the column vector $\hat{h}_j$ computed for the receive antenna j starting with the sample $(i-1)\Delta t$. For the second estimate of the impulse response of the channel $\hat{h}_{j,i}$, selection starts from the sample $Nt \times \Delta t + (i-1)\Delta t = (Nt+i-1)\Delta t$. For the $n^{th}$ estimate of the impulse response of the channel $\hat{h}_{j,i}$, selection starts from the sample $(n \times Nt + i)\Delta t$.

The step 13 computes the average in the time domain of the $K_i$ impulse response estimates. Alternatively, this average is determined in the frequency domain. The step is preferably repeated for all the channels for which $K_i$ is strictly greater than 1.

In a method conforming to one particular embodiment of the invention, the computation of the Nt×Nr impulse responses described above for the Np pilot carriers is complemented by interpolation that can be linear in time or in frequency (one dimensional (1D) interpolation) to obtain the coefficients of each channel for all carriers modulated with payload data. Interpolation can be of an order greater than 1. Interpolation can be effected in the frequency domain by multiplying the Nt vectors of $\Delta t$ points by a matrix of size $N_{FFT} \times \Delta t$ extracted from a Fourier matrix of size $N_{FFT} \times N_{FFT}$.

Figure 7:
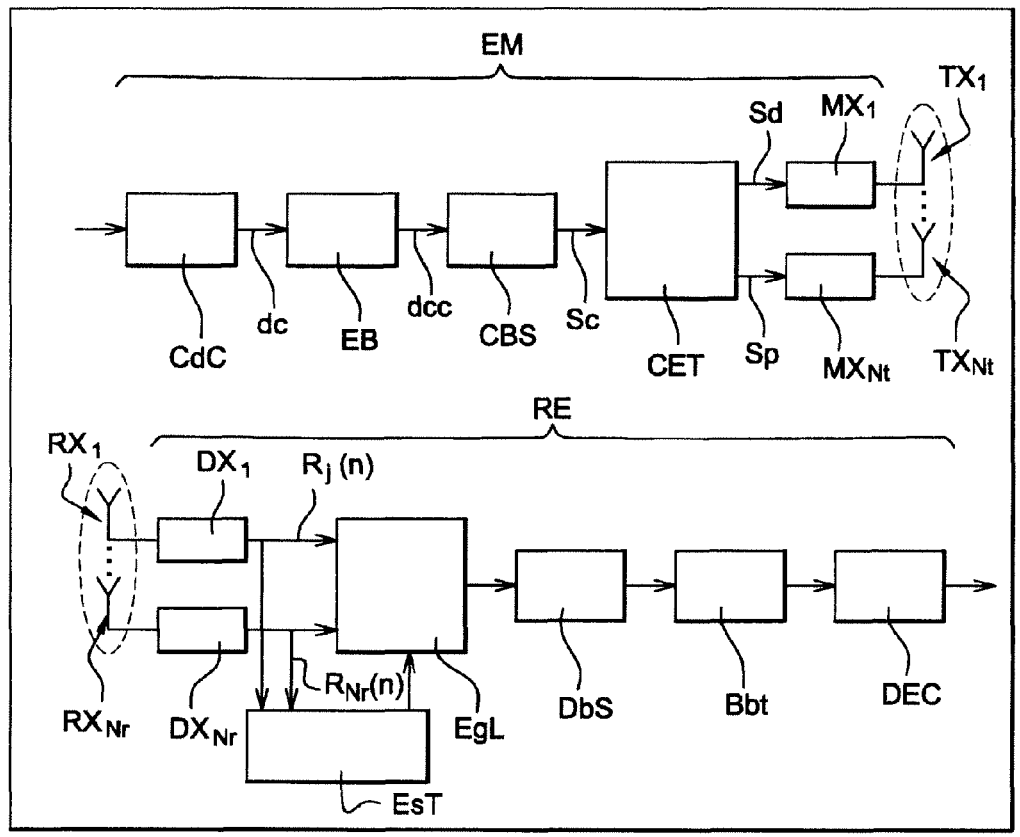
FIG. 7 is a diagram of a particular transmission system of the invention implementing a method of the invention.

FIG. 7 is a diagram of a particular transmission system for implementing a method of the invention.

The transmission system SY includes a multiple-carrier transmitter device EM and a receiver device RE. The transmitter device EM is connected to Nt transmit antennas $TX_1$ to $TX_{Nt}$, where $Nt \geq 2$. The receiver device RE is connected to Nr receive antennas $RX_1$ to $RX_{Nr}$, where $Nr \geq 1$.

In the example shown, the transmitter EM includes a channel coding module CdC, a bit interleaver EB, a binary symbol coding module CBS, a space-time coding module CET, and as many OFDM multiplexers MX as there are transmit antennas.

The channel coding module CdC codes input source data corresponding to one or more signals, typically telecommunication signals, to provide at the output coded data dc, for example data coded using a convolutional code.

The bit interleaver interleaves the bits of the coded data in accordance with a particular interleaving law to provide interleaved coded data dce.

The binary symbol coder module CBS converts the interleaved coded data dce into complex data symbols sc, for example by BPSK, QPSK or 16QAM modulation.

The space-time coding module CET determines from the complex data symbols sc a two-dimensional matrix of data symbols sd, for example using Alamouti-type coding, and generates pilot symbols.

Each OFDM multiplexer modulates data symbols sd and pilot symbols sp inserted at the input of the multiplexer by sinusoidal sub-carriers whose orthogonal functions are the conjugate Fourier components of an inverse Fourier transform of size $N_{FFT}$ corresponding to the number of carriers of an OFDM multiplex. The $N_{FFT}$ carriers include $N_{mod}$ modulated data carriers and Np pilot carriers. The set of $N_{FFT}$ carriers is called an OFDM symbol. The OFDM symbol can include null carriers and unmodulated guard carriers. The output of an OFDM multiplexer constitutes the OFDM signal in the time domain with no guard interval.

The transmitter device inserts a guard interval into the OFDM signal before transmission.

The signals transmitted include training sequences. For each transmit antenna concerned, a training sequence includes at least one replica of a basic training sequence, either phase offset or not. This basic training sequence is determined by the positioning of Np pilot symbols contained in one or more OFDM symbols, the number of which OFDM symbols is g. The basic training sequence is therefore determined by the number g, the amplitude of the pilot symbols, and the pilot carriers. Between two training sequences associated with two transmit antennas, the replicas are time offset relative to each other by a minimum of one interval $\Delta t$ least equal to the maximum length L of the transmission channels, $\Delta t \geq L$, so that the impulse responses of the various channels do not interfere with each other. The length of a channel is the transmission duration of the channel or the transmission delay introduced by the channel.

Throughout this document, the interval $\Delta t$ must be understood as being a plurality of time slots separating samples. The time offset is typically applied before modulation, for example OFDM modulation, by phase offsetting the replicas in the frequency domain.

The basic training sequence is expressed in the form of a series of pilot symbols: $\tilde{c}(p), p=0, \ldots, Np-1$ where $\tilde{c}(p)$ is the pilot symbol transmitted at the carrier frequency of index p. This basic training sequence is spread over g orthogonal symbols of a time-frequency frame. Moreover, the condition for determining the set of impulse responses is:

$$Kn \times \Delta t \leq Np$$

where:

$$Kn = \left( \sum_{i=1}^{Nt} K_i \right)$$

For example, g is chosen as equal to 1, Nt as equal to 2, $N_{FFT}$ as equal to 8, Np as equal to 8, $K_1$ and $K_2$ as equal to 2, and $\Delta t$ as equal to 2. These parameters satisfy the above condition because $(2+2) \times 2 \leq 8$.

The training sequence transmitted by the transmit antenna $TX_1$ consists of two replicas of the basic training sequence, one of which is phase offset. Its expression is as follows:

$$\tilde{c}(p)_1 = \tilde{c}(p)e^{-j2\pi \frac{p \times (1-1) \times 2}{8}} + \tilde{c}(p)e^{-j2\pi \frac{p \times (1+Nt-1) \times 2}{8}}$$
$$= \tilde{c}(p) + \tilde{c}(p)e^{-j\pi p}$$

The training sequence transmitted by the transmit antenna $TX_2$ also consists of two replicas of the basic training sequence, both of which are phase offset. Its expression is as follows:

$$\tilde{c}(p)_2 = \tilde{c}(p)e^{-j2\pi \frac{p \times (2-1) \times 2}{8}} + \tilde{c}(p)e^{-j2\pi \frac{p \times (2+Nt-1) \times 2}{8}}$$
$$= \tilde{c}(p)e^{-j\frac{\pi}{2}p} + \tilde{c}(p)e^{-j\frac{3\pi}{2}p}$$

In the example illustrated by FIG. 7, the receive device RE includes as many OFDM demultiplexers $DX_1$ to $DX_{Nr}$ as receive antennas $RX_1$ to $RX_{Nr}$. It further includes a channel estimator module EsT, an equalizer module EgL, a binary symbol decoder module DbS, a bit de-interleaver module Dbt, and a channel decoder module DEC.

Each signal received by a receive antenna is processed by an OFDM demultiplexer. An OFDM demultiplexer performs the inverse function of an OFDM multiplexer. Accordingly an OFDM demultiplexer applies a direct Fourier transform of size $N_{FFT}$ to the received signal after suppression of the guard interval. An OFDM demultiplexer demodulates a time-domain signal received by the receive antenna $RX_j$ concerned by means of an FFT of size $N_{FFT}$ to obtain a frequency-domain signal $R_j(n)$ combining the Np pilot symbols of the training sequences of the various transmit antennas.

The outputs of the OFDM demultiplexers provide frequency-domain OFDM signals $R_j(n)$ that are used by the estimator module and the equalizer module.

The channel estimator module includes means for computing the matrix A according to equation (22) or (27). These means are typically program instructions which in a preferred embodiment are incorporated into an electronic circuit, a computation unit such as a processor or the like the operation of which is then controlled by the execution of the program.

The channel estimator module includes means for computing the $K_i$ estimates of each of the Nt impulse responses $\hat{h}_j$ according to equation (25). These means are typically program instructions which in a preferred embodiment are incorporated into an electronic circuit, a computation unit such as a processor or the like the operation of which is then controlled by the execution of the program.

Knowing the parameters of the multiple-antenna system (the size $N_{FFT}$ of the FFT, the number $N_{mod}$ of modulated carriers, the offset $\Delta t$ between reference sequences, the number g of pilot OFDM symbols forming a reference sequence, the amplitude $\tilde{c}(p)$ of the pilot symbols), an estimator method and module of the invention advantageously pre-compute the matrix corresponding to the following expression in which the matrix $\tilde{A}$ is given by equation (26) or (27):

$$\tilde{A}^+ = (\tilde{A}^H \tilde{A})^{-1} \tilde{A}^H \quad (28)$$

In a preferred embodiment, the estimation method, respectively the estimator module, multiplies this pre-computed matrix product by the demodulated OFDM signal to obtain the $K_i$ estimates of each channel combined in the expression $\hat{h}_j$ according to equation (25).

The vector expression of the first estimate $\hat{h}_{j,i}$ of the impulse response of the channel separating the particular transmit antenna i, for i between 1 and Nt, from the particular receive antenna j, for j between 1 and Nr, is obtained by selecting Np successive samples of the column vector $\hat{h}_j$ computed for the receive antenna j, starting with the sample $(i-1)\Delta t$. For the second estimate $\hat{h}_{j,i}$ of the impulse response of the channel, selection starts from the sample $Nt \times \Delta t + (i-1)\Delta t = (Nt+-1)\Delta t$. For the $n^{th}$ estimate $\hat{h}_{j,i}$ of the impulse response of the channel, selection starts from the sample $(n \times Nt+i)\Delta t$.

To obtain the estimates for the $Nr \times Nt$ channels, the computation of $\hat{h}_{j,i}$ must be repeated for j varying from 1 to Nr.

The channel estimator module includes means for computing an average of the $K_i$ impulse response estimates, thus obtaining Nt impulse responses.

The following two examples illustrate the computation of the expression for $\tilde{A}$.

First example. The transmission system includes Nt=2 transmit antennas and Nr=1 receive antenna. The parameters of the system take the following values:

$N_{FFT}=8$, $N_{mod}=8$, $\Delta t=2$, $K_1=K_2=2$.

The condition $$\sum_{i=1}^{Nt} K_i \times \Delta t \leq Np$$

is satisfied because $(2+2)\times 2=8 \leq 8$.

A single OFDM symbol is assumed necessary for the channel estimation ($g=1$) and the pattern of this OFDM symbol, which constitutes the basic training sequence, is represented in Table 1. The first column represents the frequency domain indices and the second column the associated data type (P=pilot symbol). Equation (6) gives the expression for the pilot symbol modulating the carrier p where the training sequence transmitted the transmit antenna $TX_i$ is concerned, for $i=1$ or 2:

$$\tilde{c}(p)_1 = \tilde{c}(p)e^{-j2\pi\frac{p\times(1-1)\times 2}{8}} + \tilde{c}(p)e^{-j2\pi\frac{p\times(1+Nt-1)\times 2}{8}}$$
$$= \tilde{c}(p) + \tilde{c}(p)e^{-j\pi p}$$

$$\tilde{c}(p)_2 = \tilde{c}(p)e^{-j2\pi\frac{p\times(2-1)\times 2}{8}} + \tilde{c}(p)e^{-j2\pi\frac{p\times(2+Nt-1)\times 2}{8}}$$
$$= \tilde{c}(p)e^{-j\frac{\pi}{2}p} + \tilde{c}(p)e^{-j\frac{3\pi}{2}p}$$

Thus $c(p)_1$, is the pilot symbol modulating the carrier frequency p for the training sequence transmitted by the transmit antenna $TX_1$ and $c(p)_2$ is the pilot symbol modulating the carrier frequency p for the training sequence transmitted by the transmitter antenna $TX_2$.

For all the pilot carriers of this example $c(p)_i=1$. The vectors of the pilot symbols $B_1$ and $B_3$, respectively $B_2$ and $B_4$, corresponding to the two estimates of the impulse response of the channel connecting the antenna $TX_1$ to the antenna $RX_j$, respectively the antenna $TX_2$ to the antenna $RX_j$, are then expressed in the form:

$$B_1 = \begin{bmatrix} 1 \\ 1 \\ 1 \\ 1 \\ 1 \\ 1 \\ 1 \\ 1 \end{bmatrix}; B_2 = \begin{bmatrix} 1 \\ e^{-j\frac{\pi}{2}} \\ -1 \\ e^{-j\frac{3\pi}{2}} \\ 1 \\ e^{-j\frac{\pi}{2}} \\ -1 \\ e^{-j\frac{3\pi}{2}} \end{bmatrix}; B_3 = \begin{bmatrix} 1 \\ -1 \\ 1 \\ -1 \\ 1 \\ -1 \\ 1 \\ -1 \end{bmatrix}; B_4 = \begin{bmatrix} 1 \\ e^{-j\frac{3\pi}{2}} \\ -1 \\ e^{-j\frac{\pi}{2}} \\ 1 \\ e^{-j\frac{3\pi}{2}} \\ -1 \\ e^{-j\frac{\pi}{2}} \end{bmatrix}$$

The Fourier matrix F is as follows:

$$F = \frac{1}{\sqrt{8}} \begin{bmatrix} 1 & 1 & 1 & 1 & 1 & 1 & 1 & 1 \\ 1 & 0.707-0.707j & -j & -0.707-0.707j & -1 & -0.707+0.707j & j & 0.707+0.707j \\ 1 & -j & -1 & j & 1 & -j & -1 & j \\ 1 & -0.707-0.707j & j & 0.707-0.707j & -1 & 0.707+0.707j & -j & -0.707+0.707j \\ 1 & -1 & 1 & -1 & 1 & -1 & 1 & -1 \\ 1 & -0.707+0.707j & -j & 0.707+0.707j & -1 & 0.707-0.707j & j & -0.707-0.707j \\ 1 & j & -1 & -j & 1 & j & -1 & -j \\ 1 & 0.707+0.707j & j & -0.707+0.707j & -1 & -0.707-0.707j & -j & 0.707-0.707j \end{bmatrix}$$

in which the symbol j represents the solution of the equation $j^2=-1$. The matrix F' is expressed in the following form:

$$F' = \frac{1}{\sqrt{8}} \begin{bmatrix} 1 & 1 \\ 1 & 0.707-0.707j \\ 1 & -j \\ 1 & -0.707-0.707j \\ 1 & -1 \\ 1 & -0.707+0.707j \\ 1 & j \\ 1 & 0.707+0.707j \end{bmatrix}$$

The matrix $\tilde{A}$ is then expressed in the following form:

$$\tilde{A} = \frac{1}{\sqrt{8}}[\tilde{B}_{1diag} \quad \tilde{F}' \quad \tilde{B}_{2diag} \quad \tilde{F}' \quad \tilde{B}_{3diag} \quad \tilde{F}' \quad \tilde{B}_{4diag} \quad \tilde{F}']$$

i.e.:

$$\tilde{A} = \frac{1}{\sqrt{8}} \begin{bmatrix} 1 & 1 & 1 & 1 \\ 1 & e^{-j\frac{3\pi}{4}} & -1 & e^{j\frac{\pi}{4}} \\ 1 & j & 1 & j \\ 1 & e^{-j\frac{\pi}{4}} & -1 & e^{j\frac{3\pi}{4}} \\ 1 & -1 & 1 & -1 \\ 1 & e^{j\frac{\pi}{4}} & -1 & e^{-j\frac{3\pi}{4}} \\ 1 & -j & 1 & -j \\ 1 & e^{j\frac{3\pi}{4}} & -1 & e^{-j\frac{\pi}{4}} \end{bmatrix}$$

Second example. The transmission system includes $Nt=3$ transmit antennas and $Nr=1$ receive antenna. The parameters of the system take the following values:
$N_{FFT}=8$, $N_{mod}=Np=8$, $\Delta t=2$, $K_1=2$ et $K_2=K_3=1$.
The condition $$\sum_{i=1}^{Nt} K_i \times \Delta t \leq Np$$

is satisfied because $(2+1+1)\times 2=8 \leq 8$.

A single OFDM symbol is assumed necessary for the channel estimation ($g=1$), and the pattern of this OFDM symbol, which constitutes the basic training sequence, is represented in Table 1. Equation (6) gives the expression for the pilot symbol modulating the carrier p for the training sequence transmitted by the transmit antenna $TX_i$, for $i=1, 2$ or 3:

$$\tilde{c}(p)_1 = \tilde{c}(p)e^{-j2\pi \frac{p\times(1-1)\times 2}{8}} + \tilde{c}(p)e^{-j2\pi \frac{p\times(1+Nt-1)\times 2}{8}}$$

$$= \tilde{c}(p) + \tilde{c}(p)e^{-j\frac{3}{2}\pi p}$$

$$\tilde{c}(p)_2 = \tilde{c}(p)e^{-j2\pi \frac{p\times(2-1)\times 2}{8}}$$

$$= \tilde{c}(p)e^{-j\frac{\pi}{2}p}$$

$$\tilde{c}(p)_3 = \tilde{c}(p)e^{-j2\pi \frac{p\times(3-1)\times 2}{8}}$$

$$= \tilde{c}(p)e^{-j\pi p}$$

Thus $c(p)_1$ is the pilot symbol modulating the carrier frequency p for the training sequence transmitted by the transmit antenna $TX_1$, $c(p)_2$ is the pilot symbol modulating the carrier frequency p for the training sequence transmitted by the transmitter antenna $TX_2$, and $c(p)_3$ is the pilot symbol modulating the carrier frequency p for the reference sequence transmitted by the transmit antenna $TX_3$.

For example, c(p)=1 for all the pilot carriers. The vectors of the pilot symbols $B_1$ and $B_4$, respectively $B_2$ and $B_3$, corresponding to the two estimates of the impulse response of the channel connecting the antenna $TX_1$ to the antenna $RX_j$, respectively to the estimate of the impulse response of the channel connecting the antenna $TX_2$ to the antenna $RX_j$, and to the estimate of the impulse response of the channel connecting the antenna $TX_3$ to the antenna $RX_j$, are then expressed in the following form:

$$B_1 = \begin{bmatrix} 1 \\ 1 \\ 1 \\ 1 \\ 1 \\ 1 \\ 1 \\ 1 \end{bmatrix}; B_2 = \begin{bmatrix} 1 \\ e^{-j\frac{\pi}{2}} \\ -1 \\ e^{-j\frac{3\pi}{2}} \\ 1 \\ e^{-j\frac{\pi}{2}} \\ -1 \\ e^{-j\frac{3\pi}{2}} \end{bmatrix}; B_3 = \begin{bmatrix} 1 \\ -1 \\ 1 \\ -1 \\ 1 \\ -1 \\ 1 \\ -1 \end{bmatrix}; B_4 = \begin{bmatrix} 1 \\ e^{-j\frac{3\pi}{2}} \\ -1 \\ e^{-j\frac{\pi}{2}} \\ 1 \\ e^{-j\frac{3\pi}{2}} \\ -1 \\ e^{-j\frac{\pi}{2}} \end{bmatrix}$$

The Fourier matrix F is as follows:

$$F = \frac{1}{\sqrt{8}} \begin{bmatrix} 1 & 1 & 1 & 1 & 1 & 1 & 1 & 1 \\ 1 & 0.707-0.707j & -j & -0.707-0.707j & -1 & -0.707+0.707j & j & 0.707+0.707j \\ 1 & -j & -1 & j & 1 & -j & -1 & j \\ 1 & -0.707-0.707j & j & 0.707-0.707j & -1 & 0.707+0.707j & -j & -0.707+0.707j \\ 1 & -1 & 1 & -1 & 1 & -1 & 1 & -1 \\ 1 & -0.707+0.707j & -j & 0.707+0.707j & -1 & 0.707-0.707j & j & -0.707-0.707j \\ 1 & j & -1 & -j & 1 & j & -1 & -j \\ 1 & 0.707+0.707j & j & -0.707+0.707j & -1 & -0.707-0.707j & -j & 0.707-0.707j \end{bmatrix}$$

in which the symbol j represents the solution of the equation $j^2 = -1$. The matrix F' is expressed in the following form:

$$F' = \frac{1}{\sqrt{8}} \begin{bmatrix} 1 & 1 \\ 1 & 0.707-0.707j \\ 1 & -j \\ 1 & -0.707-0.707j \\ 1 & -1 \\ 1 & -0.707+0.707j \\ 1 & j \\ 1 & 0.707+0.707j \end{bmatrix}$$

The matrix $\tilde{A}$ is then expressed in the following form:

$$\tilde{A} = \frac{1}{\sqrt{8}} [\tilde{B}_{1diag} \ \tilde{F}' \ \tilde{B}_{2diag} \ \tilde{F}' \ \tilde{B}_{3diag} \ \tilde{F}' \ \tilde{B}_{4diag} \ \tilde{F}']$$

i.e.:

$$\tilde{A} = \frac{1}{\sqrt{8}} \begin{bmatrix} 1 & 1 & 1 & 1 \\ 1 & e^{-j\frac{3\pi}{4}} & -1 & e^{j\frac{\pi}{4}} \\ 1 & j & 1 & j \\ 1 & e^{-j\frac{\pi}{4}} & -1 & e^{j\frac{3\pi}{4}} \\ 1 & -1 & 1 & -1 \\ 1 & e^{j\frac{\pi}{4}} & -1 & e^{-j\frac{3\pi}{4}} \\ 1 & -j & 1 & -j \\ 1 & e^{j\frac{3\pi}{4}} & -1 & e^{-j\frac{\pi}{4}} \end{bmatrix}$$

Figure 8:
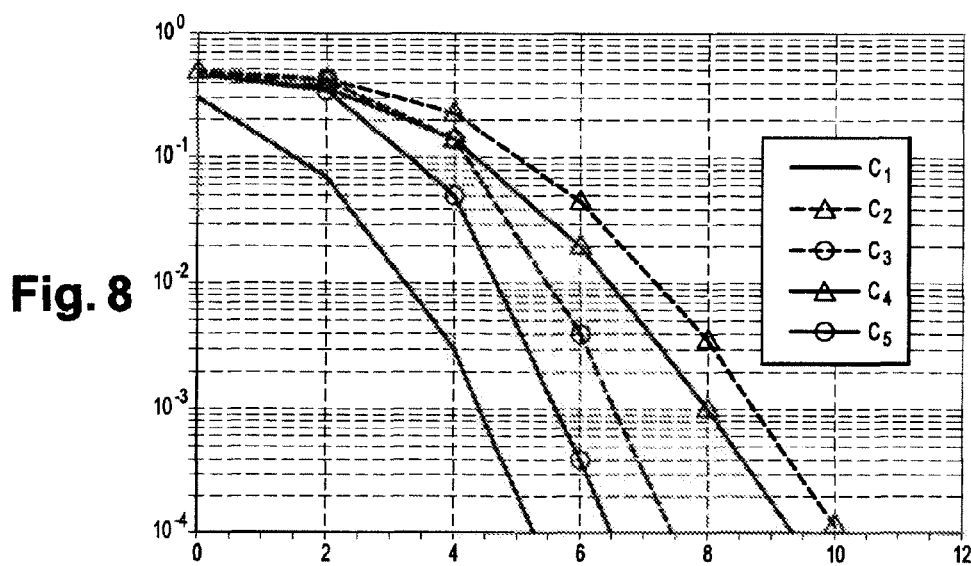
FIG. 8 is a graphical representation of simulation results.

FIG. 8 gives simulation results comparing the performance of the known Barhumi technique and a method of the invention. The simulations relate to a MIMO OFDM system and apply to a channel BRAN E that is selective in time and in frequency and is suited to a MIMO context of the external environment type, with the characteristics set out in Table 2 in Appendix A. The frame taken into account is that described in the Barhumi paper; the set of all modulated carriers is divided into two disjoint sub-sets: a set of pilot carriers and a set of payload data. The basic training sequence is a time pulse. The same transmitted pilot symbol power is imposed for both the methods compared. The figure shows the trace of the binary error rate (BER) as a function of the ratio Eb/No for QPSK modulation with an offset Δt=128. The estimation of the channels effected at the pilot frequencies is complemented by time-linear interpolation for estimating all the coefficients for the various modulated frequencies. The curve 1, c1, corresponds to a perfect estimate, the curve 2, c2, corresponds to an estimate according to Barhumi with one iteration, the curve 3, c3, corresponds to an estimate according to Barhumi with five iterations, the curve 4, c4, corresponds to an estimate according to the invention with K=2 and one iteration, and the curve 5, c5 corresponds to an estimate according to the invention with K=2 and five iterations. The iterations correspond to the iterations of the interference suppresser during equalization. Comparing the curves shows that the method of the invention has the advantage of a lower bit error rate than the Barhumi method of the same signal-to-noise ratio.

APPENDIX A

TABLE 1

| | |
|---|---|
| 0 | P |
| 1 | P |
| 2 | P |
| 3 | P |
| 4 | P |
| 5 | P |
| 6 | P |
| 7 | P |

TABLE 2

| | |
|---|---|
| Nt | 2 |
| Nr | 2 |
| Carrier frequency | 5200 MHz |
| Sampling frequency | 50 MHz |
| Carrier spacing | 48.828125 kHz |
| Cyclic prefix ratio | 0.211 |
| OFDM symbol time | 24.8 µs |
| Convolutional code length | 7 |
| Code efficiency | 1/2 |
| Channel decoding algorithm | SOVA |
| FFT size | 1024 |
| Modulated carriers | 1024 |
| Space-time code | Spatial multiplexing |

The invention claimed is:

1. A transmission method suitable for a system with Nt transmit antennas and Nr receive antennas, where Nt and Nr are at least 1, a transmit antenna being separated from a receive antenna by a transmission sub-channel, implemented by Nt multiple-carrier transmitters each including a multiplexing and modulation module using $N_{FFT}$ orthogonal functions forming orthogonal symbols intended to be transmitted by the Nt transmit antennas $TX_1$ to $TX_{Nt}$, the method including:
   a step of determining a basic training sequence from the position of Np pilot symbols in a time-frequency frame;
   a step of determining $$Kn = \left(\sum_{i=1}^{Nt} K_i\right)$$

time replicas of the basic training sequence such that at least one time replica is time offset from the basic sequence, with $K_i \geq 1$ and at least one $K_i \geq 2$, where each $K_i$ is an integer representing a number of replicas of the basic training sequence, subject to the constraints that the extreme time offset between time replicas must be less than the number Np of pilot carriers and that the minimum time offset between time replicas of two training sequences is greater than or equal to the maximum spread of the delays of the sub-channels; and
   a step of determining a training sequence for each transmit antenna $TX_i$, as the sum of the $K_i$ replicas.

2. A symbol transmission method according to claim 1, wherein a guard interval is added before transmitting an orthogonal symbol and the constraint on the minimum value of the time offset is complied with by choosing a minimum time offset equal to the value of the guard interval.

3. A symbol transmission method according to claim 1, wherein each training sequence consists of K time replicas of the basic training sequence.

4. A symbol transmission method according to claim 1, wherein the time replicas are determined in the frequency domain and the time offset is determined by a phase offset value.

5. A symbol transmission method according to claim 4, wherein the phase offset values are chosen in a particular order.

6. A symbol transmission method according to claim 5, wherein the order is known to at least one receiver associated with a receive antenna of the system.

7. A symbol transmission method according to claim 4, wherein the phase offset is a function of a carrier index.

8. A symbol transmission method according to claim 1, wherein the basic training sequence is spread over a plurality of orthogonal symbols.

9. A method for estimating transmission sub-channels in a multiple-antenna system using Nt transmit antennas, where Nt is at least 1, at least one receive antenna, and a time-frequency frame for each transmit antenna including Np pilot symbols forming a training sequence and data symbols of a payload signal, each of the Nt training sequences being the sum of $K_i$ time replicas of a basic training sequence, either time offset or not, such that the values $K_i$ are greater than or equal to 1 and at least one value $K_i$ is greater than or equal to 2, being known to the receiver and enabling the receiver to estimate an impulse response corresponding to the transmission channel separating a transmit antenna from a receive antenna concerned, the data symbols and the pilot symbols being frequency-modulated by a multiplexing and modulation module using $N_{FFT}$ orthogonal functions to form orthogonal symbols that are transmitted by the transmit antennas in the form of a multiple-carrier signal using $N_{FFT}$ carriers, the method including:
   a step of computing a matrix A constructed in the form of blocks from the training sequences and from the Fourier matrix of dimensions $N_{FFT} \times N_{FFT}$, the number of blocks of which is equal to the product of the number of orthogonal symbols of the basic training sequence by the sum of the values $K_i$, a block being determined by the product of a diagonal matrix formed of the pilot symbols contained in an orthogonal symbol of the training sequence associated with the block multiplied by the Fourier matrix and including, for a receive antenna concerned;
   a step of computing $K_i$ estimates of at least one of the Nt impulse responses in the time domain by multiplying by the pseudo-inverse matrix of the matrix A Np pilot symbols extracted from a frequency-domain signal obtained after demodulation of a time-domain signal received by the receive antenna concerned by means of a Fourier transform of size $N_{FFT}$; and
   a step of computing an average over the $K_i$ estimates of the impulse response concerned.

10. A transmission channel estimation method according to claim 9, wherein the computation of the Nt impulse responses is extended by means of interpolation to the carriers modulated by data.

11. A transmission channel estimation method according to claim 9, wherein the step of computing the Nt impulse responses is repeated for each receive antenna concerned of the multiple-antenna system.

12. A transmission module including a multiplexing and modulation module using $N_{FFT}$ orthogonal functions, suitable for a multiple-antenna system using Nt transmit antennas, Nr receive antennas, where Nt and Nr are at least 1, and a time-frequency frame for each transmit antenna including pilot symbols and data symbols of a payload signal, the data symbols and the pilot symbols being frequency-modulated by the multiplexing and modulation module to form orthogonal symbols that are transmitted by a transmit antenna in the form of a multiple-carrier signal using $N_{FFT}$ carriers and using Np pilot carriers, the module including:

a module for determining a basic training sequence from the position of Np pilot symbols in the time-frequency frame associated with a particular transmit antenna;

a module for determining Kn, where $$Kn = \left( \sum_{i=1}^{Nt} K_i \right),$$

time replicas of the basic training sequence such that at least one replica is time offset from the basic sequence, with $K_i \geq 1$ and at least one $K_i \geq 2$, where each $K_i$ is an integer representing a number of replicas of the basic training sequence, subject to the constraints that the extreme time difference between time replicas is less than the number Np of pilot carriers and that the minimum time offset between time replicas of two training sequences is greater than or equal to the maximum spread of the delays of the sub-channels connecting a transmit antenna to a receive antenna; and a module for determining a training sequence for each transmit antenna as the sum of $K_i$ time replicas.

13. A transmitter for a multiple-antenna system which includes at least one transmission module according to claim 12.

14. A module for estimating transmission channels in a multiple-antenna system using Nt transmit antennas, where Nt is at least 1, at least one receive antenna, and a time-frequency frame for each transmit antenna including pilot symbols forming a training sequence and data symbols of a payload signal, the Nt training sequences being known to the receiver and enabling the receiver to estimate Nt impulse responses corresponding to the Nt transmission channels respectively separating one of the transmit antennas from the receive antenna concerned, the data symbols and the pilot symbols being frequency-modulated by a multiplexing and modulation module using $N_{FFT}$ orthogonal functions to form orthogonal symbols that are transmitted by the transmit antennas in the form of a multiple-carrier signal using $N_{FFT}$ carriers with Np pilot carriers, characterized in that it includes means for computing a matrix A constructed in the form of blocks from the training sequences and from the Fourier matrix of dimensions $N_{FFT} \times N_{FFT}$, the number of blocks of which is equal to the product of the number of orthogonal symbols of the basic training sequence by the sum of the values $K_i$, a block being determined by the product of a diagonal matrix formed of the pilot symbols contained in an orthogonal symbol of the training sequence associated with the block multiplied by the Fourier matrix, and, for a receive antenna concerned:

means for computing $K_i$ estimates of at least one of the Nt impulse responses in the time domain by multiplying Np pilot symbols extracted from a frequency-domain signal obtained after demodulation of a time-domain signal received by the receive antenna concerned by means of an FFT of size $N_{FFT}$ by the pseudo-inverse matrix of the matrix A; and means for computing the average of the $K_i$ estimates of the impulse response concerned.

15. A receiver for a multiple-antenna system which includes at least one module according to claim 14 for estimating transmission channels.

16. A multiple-antenna system which includes at least one receiver which includes:

at least a module for estimating transmission channels in a multiple-antenna system using Nt transmit antennas, where Nt is at least 1, at least one receive antenna, and a time-frequency frame for each transmit antenna including pilot symbols forming a training sequence and data symbols of a payload signal, the Nt training sequences being known to the receiver and enabling the receiver to estimate Nt impulse responses corresponding to the Nt transmission channels respectively separating one of the transmit antennas from the receive antenna concerned, the data symbols and the pilot symbols being frequency-modulated by a multiplexing and modulation module using $N_{FFT}$ orthogonal functions to form orthogonal symbols that are transmitted by the transmit antennas in the form of a multiple-carrier signal using $N_{FFT}$ carriers with Np pilot carriers, and means for computing a matrix A constructed in the form of blocks from the training sequences and from the Fourier matrix of dimensions $N_{FFT} \times N_{FFT}$, the number of blocks of which is equal to the product of the number of orthogonal symbols of the basic training sequence by the sum of the values $K_i$, a block being determined by the product of a diagonal matrix formed of the pilot symbols contained in an orthogonal symbol of the training sequence associated with the block multiplied by the Fourier matrix, and, for a receive antenna concerned:

means for computing $K_i$ estimates of at least one of the Nt impulse responses in the time domain by multiplying Np pilot symbols extracted from a frequency-domain signal obtained after demodulation of a time-domain signal received by the receive antenna concerned by means of an FFT of size $N_{FFT}$ by the pseudo-inverse matrix of the matrix A; and means for computing the average of the $K_i$ estimates of the impulse response concerned.

17. A computer-readable non-transitory medium providing computer executable instructions that when loaded onto a transmitter causes the transmitter to perform at least a transmission method according claim 1.

18. A computer-readable non-transitory medium providing computer executable instructions that when loaded onto a receiver causes the receiver to perform at least a channel estimation method according to claim 9.

* * * * *